US012623268B2

(12) United States Patent
Blanco De Souza

(10) Patent No.: US 12,623,268 B2
(45) Date of Patent: May 12, 2026

(54) MEASURING THE FLATNESS OF ROLLING TRAINS FOR ALUMINIUM

(71) Applicant: Primetals Technologies Germany GmbH, Erlangen (DE)

(72) Inventor: Jose Claudio Blanco De Souza, Erlangen (DE)

(73) Assignee: Primetals Technologies Germany GmbH (DE)

( * ) Notice: Subject to any disclaimer, the term of this patent is extended or adjusted under 35 U.S.C. 154(b) by 267 days.

(21) Appl. No.: 18/262,660

(22) PCT Filed: Jan. 24, 2022

(86) PCT No.: PCT/EP2022/051485
§ 371 (c)(1),
(2) Date: Jul. 24, 2023

(87) PCT Pub. No.: WO2022/157356
PCT Pub. Date: Jul. 28, 2022

(65) Prior Publication Data
US 2024/0299998 A1      Sep. 12, 2024

(30) Foreign Application Priority Data

Jan. 25, 2021    (EP) ...................................... 21153138

(51) Int. Cl.
*G01B 7/06*          (2006.01)
*B21B 1/22*          (2006.01)
(Continued)

(52) U.S. Cl.
CPC .............. *B21B 38/02* (2013.01); *G01B 7/107* (2013.01); *B21B 2003/001* (2013.01)

(58) Field of Classification Search
CPC .............. B21B 38/02; B21B 2003/001; B21B 2001/225; B21B 2015/0021
See application file for complete search history.

(56) References Cited

U.S. PATENT DOCUMENTS 5,875,831 A * 3/1999 Nohara .................. C23G 3/027
164/476
6,263,716 B1 * 7/2001 Kaplan ..................... B21B 1/34
72/229
(Continued)

FOREIGN PATENT DOCUMENTS

CN        108351206 A     7/2018
CN        110560484 A     12/2019
(Continued)

OTHER PUBLICATIONS

International Search Report mailed Apr. 8, 2022 in corresponding PCT International Application No. PCT/EP2022/051485.
(Continued)

*Primary Examiner* — Mohammed S. Alawadi
(74) *Attorney, Agent, or Firm* — OSTROLENK FABER LLP

(57) ABSTRACT

A rolling stand for rolling a hot aluminium strip, having at the outlet side, in this order, a trimming device that cuts the metal strip from both sides such that only the remaining central region of the metal strip is fed to the downstream devices; a front deflection roller that deflects the metal strip away from a direct connecting line between the rolling stand and the rear deflection roller; a measuring assembly that has a mechanical excitation device that excites the metal strip to mechanically oscillate in the direction of its thickness and a measuring device that senses, for a plurality of regions of the metal strip lying adjacent to one another in the direction of the width of the metal strip, the amplitude of the excited mechanical oscillation of the respective region; and a coiling device that has a rear deflection roller upstream of a coiler.

13 Claims, 3 Drawing Sheets

(51) Int. Cl.
 B21B 3/00         (2006.01)
 B21B 15/00        (2006.01)
 B21B 38/02        (2006.01)
 G01B 21/08        (2006.01)

(56)          References Cited

U.S. PATENT DOCUMENTS

| | | |
|---|---|---|
| 10,384,248 B2 | 8/2019 | Breuer |
| 11,235,365 B2 | 2/2022 | Bouby et al. |
| 2001/0007422 A1 | 7/2001 | Noe et al. |
| 2002/0080851 A1 | 6/2002 | Faure et al. |
| 2003/0121334 A1 | 7/2003 | Stammberger et al. |
| 2016/0256906 A1 | 9/2016 | Breuer |
| 2019/0315112 A1* | 10/2019 | Saljé .................. B32B 38/0004 |

FOREIGN PATENT DOCUMENTS

| | | |
|---|---|---|
| DE | 19725726 A1 | 1/1999 |
| DE | 10257639 A1 | 7/2004 |
| JP | H10-170363 A | 6/1998 |
| JP | 2016-533901 A | 11/2016 |
| WO | WO 9838482 A1 | 9/1998 |
| WO | WO 2010049209 A1 | 5/2010 |

OTHER PUBLICATIONS

Office Action dated Nov. 25, 2024 in corresponding Japanese Patent Application No. 2023-544586 with English translation.
Chinese Office Action, dated Jun. 18, 2025, issued in corresponding Chinese Patent Application No. 2022800114522. English translation.

* cited by examiner

1

MEASURING THE FLATNESS OF ROLLING TRAINS FOR ALUMINIUM

CROSS-REFERENCE TO RELATED APPLICATIONS

The present application is a 35 U.S.C. §§ 371 national stage application of International Application No. PCT/EP2022/051485, filed Jan. 24, 2022, which claims priority to European Patent Application No. 21153138.9, filed Jan. 25, 2021, the contents of which are incorporated herein by reference.

FIELD OF THE INVENTION

The present invention proceeds from a rolling device for a metal strip of aluminum
    wherein the rolling device has a roll stand,
    wherein the rolling device has a coiling device disposed on the outlet side of the roll stand, having a coiler and a rear deflection roller,
    wherein the rear deflection roller is disposed between the roll stand and the coiler,
    wherein the rolling device has a measuring assembly which is disposed between the roll stand and the rear deflection roller and is specified to determine a flatness of the metal strip,
    wherein the measuring assembly has a mechanical excitation device by means of which the metal strip in the thickness direction thereof is excitable to mechanically oscillate,
    wherein the measuring assembly has a measuring device by means of which, for a plurality of regions of the metal strip that lie next to one another in the width direction of the metal strip, the amplitude of the excited mechanical oscillation of the respective region of the metal strip is detectable.

PRIOR ART

Such a rolling device is known for rolling trains for cold-rolling steel. Purely by way of example, reference may be made to WO 98/38482 A1. The flatness of the metal strip can be determined from the detected amplitudes of the mechanical oscillations of the regions of the metal strip. This is also explained in more detail in the WO publication mentioned.

SUMMARY OF THE INVENTION

The flatness of the rolled metal strip is an important quality feature when rolling metal strips. It must in particular be avoided that the rolled metal strip becomes undulated after rolling. This set of issues likewise arises when cold-rolling steel and when hot-rolling aluminum. However, while the above-mentioned design embodiment of a rolling device is known in the context of the cold-rolling of steel, a rolling device of this type cannot readily also be used in the hot-rolling of aluminum. There are various reasons for this.

One reason lies in that an aluminum strip has different physical properties and thus has a different oscillating behavior, for example different inherent frequencies, than a steel strip in the case of an identical geometry of the rolling device. In particular, the inherent frequencies in an aluminum strip are significantly lower than in a steel strip. In order to avoid interferences by inherent frequencies of the aluminum strip, a significantly lower frequency of the excited mechanical oscillation would have to be chosen in an aluminum strip than in a steel strip. For practical reasons, this theoretical possibility of operating at a lower frequency has proven inexpedient.

A further reason lies in that trimming of the lateral edges of the aluminum strip is necessary after the hot-rolling of an aluminum strip. For this purpose, a trimming device by means of which a band of the metal strip is in each case severed on both sides of the aluminum strip is disposed on the outlet side of the of the roll stand in a rolling device for hot-rolling an aluminum strip. However, at least the peripheral regions of the aluminum strip are excited to mechanically oscillate as a result of the cutting procedure associated with the trimming. These oscillations interfere with the correct detection of the amplitudes of the excited mechanical oscillation at least in the peripheral regions of the aluminum strip and therefore falsify the result.

Therefore, a detection by way of contact by means of a segmented tension measurement roll takes place for detecting the flatness of an aluminum strip. This solution has various disadvantages. For example, there is the risk of scratching or otherwise damaging the surface of the aluminum strip. Furthermore, the measurement is relatively inaccurate. Moreover, the use of a segmented tension measurement roll is cost-intensive. Finally, there is the risk of damage to the sensors of the segmented tension measurement roll.

The object of the present invention lies in achieving possibilities by means of which a rolling device of the type mentioned at the outset can be modified in such a manner that said invention can be used in a rolling device for a hot aluminum strip.

The object is achieved by a rolling device having the claimed features. Advantageous design embodiments of the rolling device are the subject matter of the dependent claims.

According to the invention, a rolling device of the type mentioned at the outset is designed
    in that the rolling device has a trimming device which is disposed on the outlet side of the roll stand and by means of which one band of the metal strip is in each case able to be severed on both sides of the metal strip so that only one remaining central region of the metal strip is supplied to the rear deflection roller and from the latter to the coiler, and
    in that the rolling device has a front deflection roller which is disposed between the trimming device and the measuring assembly and by means of which the metal strip is able to be deflected from a direct connecting line between the roll stand and the rear deflection roller.

Owing to the trimming device, the rolling device must be a rolling device for rolling an aluminum strip. This is because trimming devices of this type are neither required nor present in the case of other metals, in particular in the case of steel. The metal strip, by means of the front deflection roller, is deflected from an outlet direction, by way of which the metal strip runs out of the roll stand, into the transport direction, by way of which the metal strip passes through the measuring assembly. The deflection per se—thus the change in direction per se—is of secondary importance. In particular, the degree to which the metal strip 1 is deflected by means of the front deflection roller 8 may be relatively minor. A deflection by a few degrees is sufficient, for example a deflection by 5° to 10°. However, a greater deflection is readily possible. However, two decisive effects are achieved by the deflection at the front deflection roller. On the one hand, the free distance over which the aluminum strip can oscillate is shortened. This is because the free distance no longer extends from the roll stand, or the trimming device, respectively, to the rear deflection roller, but owing to the front deflection roller now extends only from the front deflection roller to the rear deflection roller. As a result, the inherent frequencies of the aluminum strip in the region of the measuring assembly are increased. Furthermore, those oscillations in the aluminum strip that are excited by the trimming device are pacified by the front deflection roller. The interferences caused by the trimming device are thus eliminated or at least largely damped.

The mechanical excitation device can in particular be configured as a suction device by means of which the metal strip on one side is able to be periodically impinged with a vacuum. This design embodiment is established, robust and reliable. The mean amplitude of the mechanical oscillations excited by the vacuum can be set by the degree by which an air suction is varied. The frequency of the excited mechanical oscillations can be set by the frequency at which the air suction is varied.

The measuring device can in particular be configured as a measuring device operating in a contactless manner, by means of which the amplitude of the excited mechanical oscillation of the respective region of the metal strip is detectable in a contactless manner. In a manner analogous to the design embodiment of the mechanical excitation device, this design embodiment is also established, robust and reliable.

A measuring device operating in a contactless manner may, for inducing eddy currents in the metal strip, have a number of electromagnetic excitation devices, and for the detection of the amplitude of the mechanical oscillation of the respective region of the metal strip have in each case at least one electromagnetic receiver device by means of which the intensity of the eddy current excited in the respective region of the metal strip is detectable.

In particular, a measuring assembly in which the mechanical excitation device and the measuring device are disposed is used in various rolling mills which are correspondingly equipped by Siemens VAI Metals Technologies GmbH, Linz, Austria. The product name at the time for the measuring assembly by Siemens VAI Metals Technologies GmbH was SIFLAT. A measuring assembly of this type is also explained in the WO publication mentioned at the outset.

The front deflection roller in the thickness direction of the metal strip is preferably movable substantially orthogonally to the connecting line of the roll stand and the rear deflection roller. The degree of the movement is preferably such that the front deflection roller in a retracted position does not deflect the metal strip from the connecting line of the rolling gap and the rear deflection roller, but does do so in a deployed position. As a result of this design embodiment it can be achieved in particular that clean incipient coiling "without interference by the front deflection roller and the measuring assembly" is initially possible, and the front deflection roller is actuated onto the metal strip and deflects the latter only once a stable state has been reached after incipient coiling.

The front deflection roller is preferably actuatable onto the metal strip from above. In this case in particular, the front deflection roller does not have to be disposed in the tight installation space between the roll stand and the rear deflection roller. Furthermore, this design embodiment is easier to retrofit in an already existing rolling device that has not yet been designed according to the invention.

It is possible that the front deflection roller is mechanically connected to the measuring assembly so that the front deflection roller and the measuring assembly are movable only conjointly. This design embodiment is particularly expedient when the front deflection roller and the measuring assembly are located on the same side of the metal strip. This may simplify the mechanical construction and require fewer actuators. This applies particularly in the case of the front deflection roller being connected to the measuring assembly by way of a pivotably mounted lever arm so that when the front deflection roller is actuated onto the metal strip a spacing of the measuring assembly from the metal strip (or from a connecting line between the front and the rear deflection roller) remains constant when pivoting the lever arm.

It is furthermore possible that a central deflection roller is disposed between the measuring assembly and the rear deflection roller. As a result of this design embodiment, the free distance in the region of the measuring assembly, which determines the inherent frequencies of the metal strip, can be shortened even more.

The central deflection roller is preferably mechanically connected to the measuring assembly such that the measuring assembly and the central deflection roller are movable only conjointly. In particular when the front deflection roller is additionally also mechanically connected to the measuring assembly, it can be automatically guaranteed as a result that the mechanical excitation device and the measuring device are disposed at the desired spacings from the metal strip when moving the unit consisting of the measuring assembly, the front deflection roller and the central deflection roller toward the metal strip.

The measuring device is preferably water-cooled. As a result, it is possible in particular for the measuring device to be sufficiently cooled and for measurement of the flatness to be carried out by means of the measuring device even on a very hot aluminum strip.

A spacing of the measuring device from the metal strip is preferably adjustable between a minimum spacing and a maximum spacing. As a result, the spacing of the measuring device from the metal strip can be enlarged in particular when required. Such a requirement can arise, for example, as a result of a failure in water cooling.

The water cooling, the minimum spacing, and the maximum spacing are preferably mutually adapted in such a manner that the measuring device at the minimum spacing is able to be operated permanently with water cooling, and at the maximum spacing is also able to be operated permanently without water cooling, or at least is not damaged despite the thermal effect of the hot metal strip on the measuring device.

BRIEF DESCRIPTION OF THE DRAWINGS

The above-described properties, features and advantages of the present invention and the way in which these are achieved will become more evident and more readily understandable together with the following description of the exemplary embodiments which will be explained in more detail in conjunction with the drawings in which, in a schematic illustration.

DESCRIPTION OF THE EMBODIMENTS

Figure 1:
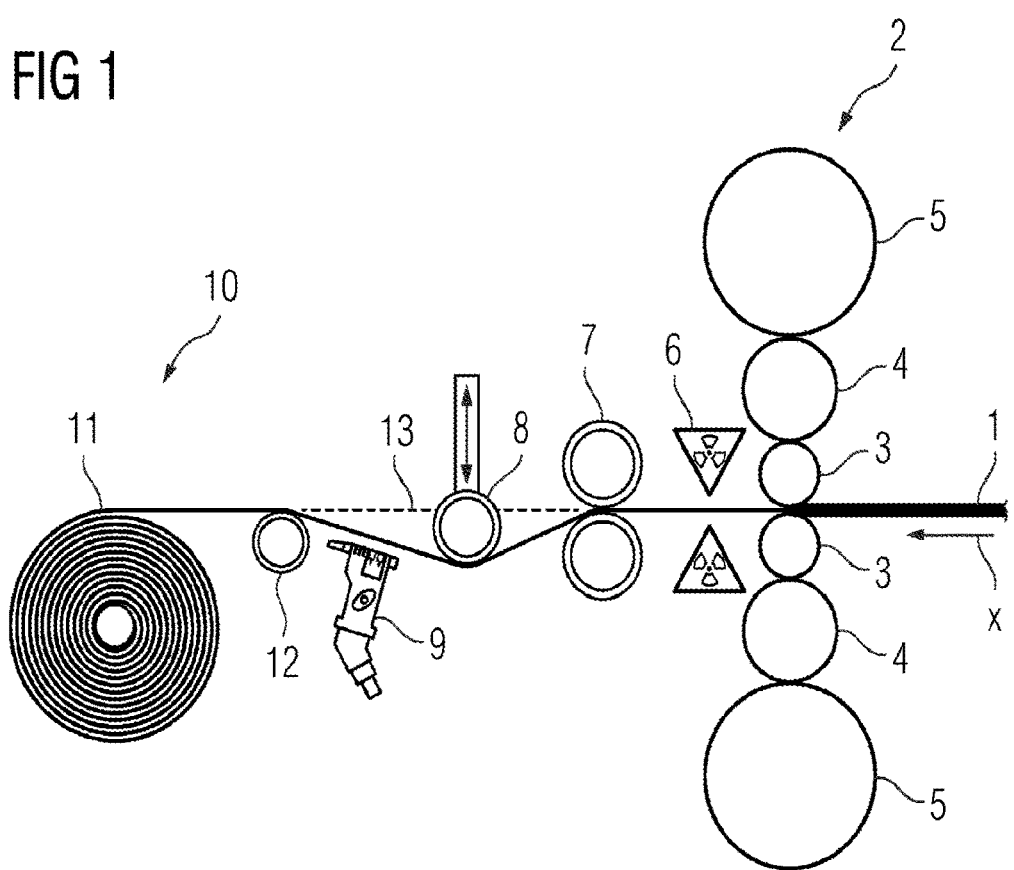
FIG. 1 shows a lateral view of a rolling device.
Figure 2:
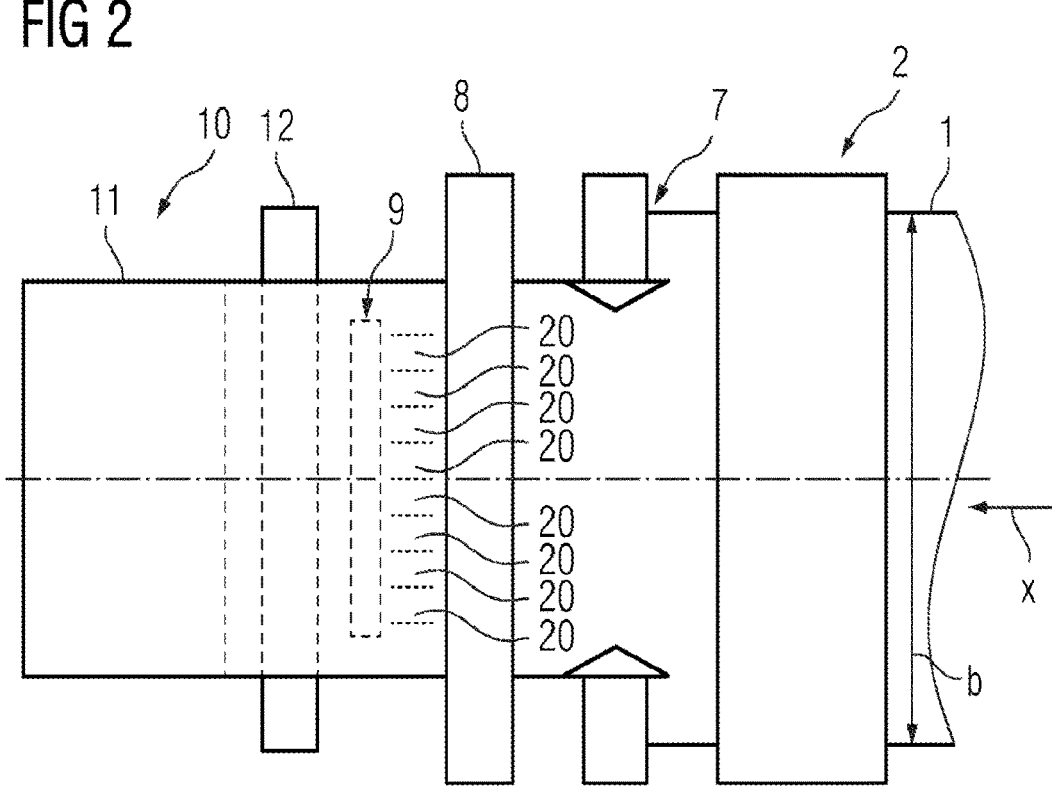
FIG. 2 shows the rolling device of FIG. 1 from above.

According to FIGS. 1 and 2, a rolling device for a metal strip 1 has a roll stand 2. The roll stand 2 in FIG. 1 is illustrated as a six-high stand, thus as a roll stand which in addition to its working rollers 3 has intermediate rollers 4 and support rollers 5. However, the roll stand 2 could also be of a different configuration, for example as a four-high stand in which only the support rollers 5 are present in addition to the working rollers 3. In this case, the support rollers 5 would of course bear directly on the working rollers 3. Other design embodiments are also possible, for example as a 20-roller roll stand or as a 12-roller roll stand.

The metal strip 1 is a hot aluminum strip. It has a width b of usually 100 cm or more (in some instances up to 225 cm and more) and a temperature in the region of above 300° C., usually between 315° C. and 350° C. The metal strip 1 is supplied to the roll stand 2 in a conveying direction x. It typically also runs out of the roll stand 2 in the same conveying direction x. The conveying direction x is typically horizontal or at least almost horizontal. A transport speed at which the metal strip 1 runs out of the roll stand 2 can be up to 400 m/min, sometimes even somewhat above this.

On the outlet side of the roll stand 2, in this sequence, are disposed a thickness measuring device 6, a trimming device 7, a front deflection roller 8, a measuring assembly 9, and a coiling device 10. The coiling device 10 has a coiler 11 and a rear deflection roller 12, wherein the rear deflection roller 12 is disposed between the roll stand 2 and the coiler 11, more specifically between the measuring assembly 9 and the coiler 11.

The roll stand 2 on the inlet side can have a further upstream roll stand. A plurality of further roll stands may also be disposed upstream of the roll stand 2 on the inlet side. It is likewise possible that a coiling device for uncoiling the metal strip 1 is disposed directly upstream of the roll stand 2, for example. Which of these design embodiments is provided is of secondary importance in the context of the present invention. For this reason, the design embodiment of the rolling device on the inlet side of the roll stand 2 is not illustrated in the figures and will therefore also not be explained in more detail.

After running out of the roll stand 2, the thickness of the metal strip 1 is first detected by means of the thickness measuring device 6 (optionally at specific localities across the strip width). The detection of the thickness is of secondary importance in the context of the present invention. For this reason, the thickness measuring device 6 is not included in the illustration in FIG. 2. For the same reason, the evaluation of the detected thickness is also not explained in more detail.

Then, one band of the metal strip 1 is in each case severed on both sides of the metal strip 1 by means of the trimming device 7. In this way, only a remaining central region of the metal strip 1 is supplied to the subsequent elements, i.e. to the front deflection roller 8, the measuring assembly 9, the rear deflection roller 12 and the coiler 11. In FIG. 2, the severed bands are illustrated so as to be wider in relation to the central region than in reality. In reality, said bands typically have a relatively minor width, typically between 1.5 cm and 4.0 cm.

The direction in which the metal strip 1 is transported is in each case changed by means of the two deflection rollers 8, 12. In particular, the metal strip 1 is deflected from a direct connecting line 13 between the roll stand 2 (more specifically: the rolling gap of the roll stand 2) and the rear deflection roller 12 by means of the front deflection roller 8.

According to FIGS. 1 and 2, the front deflection roller 8 is actuatable onto the metal strip 1 from above. This design embodiment is advantageous in particular when the front deflection roller 8 is to be retrofitted in an already existing rolling device, i.e. a rolling device which does not yet have the front deflection roller 8.

Irrespective of whether the front deflection roller 8 is actuatable onto the metal strip 1 from above or from below, the front deflection roller 8 is however movable orthogonally, or at least substantially orthogonally, to the connecting line 13 mentioned, and thus in the thickness direction of the metal strip 1. This is indicated in FIG. 1 by a double arrow above the upper deflection roller 8. Furthermore, the actuation of the front deflection roller 8 onto the metal strip 1 can take place in a controlled manner (i.e. without feedback control) or in a feedback-controlled manner, depending on the requirement. The drive for actuating the front deflection roller 8 can be electric, hydraulic or pneumatic, depending on the requirement.

The construction and the functional mode of the measuring assembly 9 will be explained in more detail below in conjunction with FIGS. 3 and 4.

Figures 3, 4:
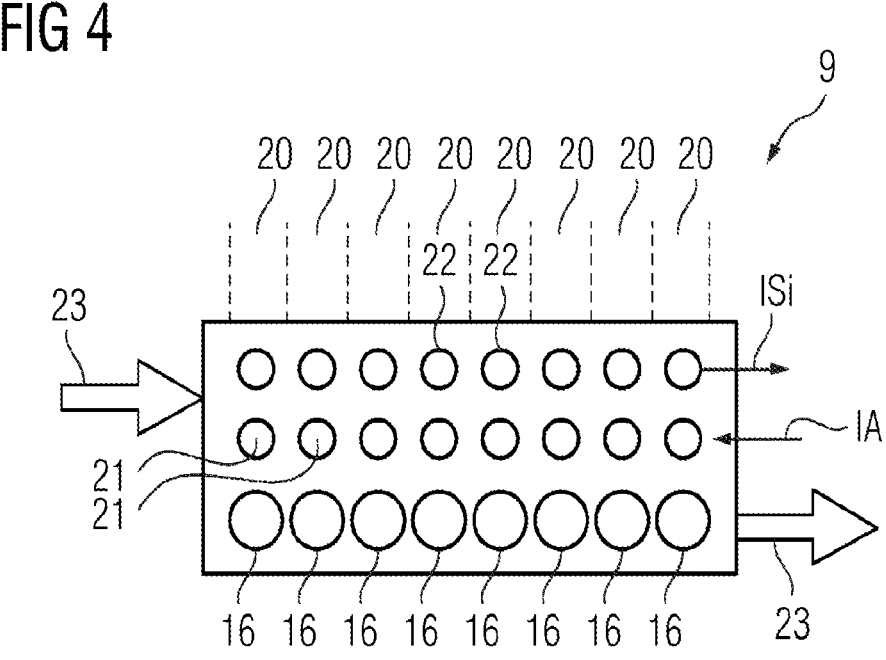
FIG. 3 shows a measuring assembly and two deflection rollers from the side.
FIG. 4 shows the measuring assembly of FIG. 3 from above.

According to FIG. 3, the measuring assembly 9 has a mechanical excitation device 14. The metal strip 1 in the thickness direction thereof can be excited to mechanically oscillate by means of the mechanical excitation device 14. Specifically, the metal strip 1 in FIG. 3 is plotted in a central position by a solid line, and in the completely deflected positions by dashed lines. The mechanical excitation device 14 according to the illustration in FIG. 3 can be configured as a suction device, for example. For example, a suction fan 15 by way of suction openings 16 (see also FIG. 4) and a suction duct 17 can suction air from the region between the metal strip 1 and the measuring assembly 9, and thus periodically impinge the metal strip 1 with a vacuum on one side. The degree to which air is suctioned can be varied by directly actuating the suction fan 15 and/or by actuating a modulator element 18. In the case of an actuation of the modulator element 18, the modulator element 18 periodically varies the cross section and thus the flow resistance of the suction duct 17. The modulator element 18 can be configured as an oval or elliptic element, for example, that is rotated in the suction duct 17.

The frequency at which the metal strip 1 mechanically oscillates is determined by the frequency at which the excitation device 14 excites the metal strip 1 to mechanically oscillate. The frequency is typically in the upper single-digit or low double-digit Hertz range, i.e. between 5 Hz and 30 Hz. Said frequency is in most instances between 8 Hz and 20 Hz, in particular between 10 Hz and 15 Hz. The amplitude of the mechanical oscillation of the metal strip 1 can be set by the degree of the air suction. In most instances, the air suction is set in such a manner that the amplitude of the mechanical oscillation of the metal strip 1 is in the range between 50 µm and 200 µm, in particular between 80 µm and 125 µm.

The measuring assembly 9 furthermore has a measuring device 19 by means of which, for a plurality of regions 20 of the metal strip 1 (see FIGS. 2 and 4), the respective amplitude $A_i$ (where i=1, 2, . . . n and n=number of regions 20) of the excited mechanical oscillation of the respective region 20 of the metal strip 1 can be detected. The regions 20 according to the illustration in FIGS. 2 and 4 lie next to one another when viewed in the width direction of the metal strip 1. The illustrated number of in total eight regions 20 is to be understood as purely exemplary.

The flatness of the metal strip 1 can be determined in a manner known per se from the determined amplitudes Ai. In the following, the reciprocal value of the respective amplitude Ai of the respective region 20 is referred to as KWi. The following correlation thus applies for all regions 20

$$KWi = \frac{1}{Ai}. \tag{1}$$

Furthermore, the mean value of the reciprocal values KWi is referred to as KW (i.e. without the index i):

$$KW = \frac{1}{n}\sum_i KWi. \tag{2}$$

In this way, $$\delta\sigma i = \sigma i\left(\frac{KWi - KW}{KW}\right) \tag{3}$$

the variance $\delta\sigma i$ of the specific tension $\sigma i$ can be determined for the $i^{th}$ region 20. The specific tension $\sigma i$ for the $i^{th}$ region 20 is derived as the mean value of the specific tensions $\sigma i$ determined for the individual regions 20, optionally weighted with the thicknesses of the respective regions 20. The flatness can then be determined in a manner known per se from the variances $\delta\sigma i$ of the specific tension $\sigma i$.

The evaluation of the determined amplitudes Ai, or the determination the flatness of the metal strip 1, respectively, is not per se subject matter of the present invention. Rather, the subject matter of the present invention is the design embodiment of the rolling device that enables the detection of the measured values by means of which the amplitudes Ai can be determined.

The measuring device 19 can in particular be configured as a measuring device operating in a contactless manner, i.e. as a measuring device 19 by means of which the amplitudes Ai of the excited mechanical oscillation of the regions 20 of the metal strip 1 are detectable in a contactless manner. For example, the measuring device 19 can have a number of electromagnetic excitation devices 21 by means of which eddy currents can be induced in the metal strip 1. In an individual case, it is possible for only a single electromagnetic excitation device 20 to be present. Often, a plurality of electromagnetic excitation devices 21 can be present, which in each case induce eddy currents in a plurality of regions 20. According to FIG. 4, the measuring device 19 can in each case have an electromagnetic excitation device 21 of this type for each region 20 of the metal strip 1. The respective excitation device 21 can be configured as an excitation coil. The excitation devices 21 are impinged with an excitation current IA, which is uniform or individually set. The impingement with the excitation current IA in is illustrated FIG. 4 only for one of the excitation devices 21.

The excitation current IA has an excitation frequency. The excitation frequency in most instances is in the region of several kHz, often even in the single-digit MHz range. Eddy currents are induced in the metal strip 1 by the excitation currents IA. The eddy currents can in turn be identified and detected by means of electromagnetic receiver devices 22. The electromagnetic receiver devices 22 are individually assigned to the regions 20. At least one electromagnetic receiver device 2 is thus in each case present for each region 20. The electromagnetic receiver devices 22 can be configured as receiver coils. The electromagnetic receiver devices 22 supply detected sensor currents ISi (wherein the index i again represents the respective region 20). The intensity of the respective sensor current ISi is characteristic of the intensity of the eddy current excited in the respective region of the metal strip 1. The respective current spacing of the respective region 20 of the metal strip 1 from the measuring device 19 can be determined in a manner known per se from the ratio between the respective sensor current ISi and the—optionally respective—excitation current IA. The development of this spacing over time is supplied by the amplitude Ai of the mechanical oscillation of the respective region 20 of the metal strip 1. As has already been explained, a conclusion pertaining to the flatness of the metal strip 1 can then be drawn from the amplitudes Ai.

In order to determine the spacings of the regions 20, it may be necessary for a sensitivity to be determined generally for all regions 20 or specifically for the respective region 20, i.e. a factor by means of which the spacing can be determined from the ratio between the respective sensor current ISi and the excitation current IA. The determination of a sensitivity of this type can take place in the context of experiments.

It is possible that the measuring assembly 9, in particular the measuring device 19, withstands the rough operating conditions, in particular the high thermal stress by the hot metal strip 1, without active cooling. In most instances however, the measuring device 19 is water-cooled. In FIG. 4, this can be seen in that the measuring device 19 is supplied with (relatively cold) cooling water 23, and the cooling water 23 (after cooling the measuring device 19) is discharged from the measuring device 19 again.

Most typically, a spacing a of the measuring device 19 from the metal strip 1 is adjustable. The spacing a relates to the non-deflected state of the metal strip 1. For example, the measuring device 19 can be disposed so as to be movable within the measuring assembly 9, or the measuring assembly 9 can be moved as an entity. The spacing a is adjustable between a minimum spacing (for example completely deployed) and a maximum spacing (for example completely retracted). The measuring device 19 can be permanently operated at the minimum spacing as long as the water cooling is operative. The operation of the water cooling can be monitored, for example. However, when the water cooling is not operative, for example due to a failure, any further operation of the measuring device 19, or in many cases even maintaining the measuring device 19 at the minimum spacing at all, would in many cases very rapidly lead to damage to the measuring device 19. Therefore, when the water cooling is inoperative, the measuring device 19 is retracted, preferably to the maximum spacing. Despite the thermal effect of the hot metal strip 1, at the maximum spacing the measuring device 19 is at least not damaged. During operation, the spacing a of the measuring device 19 from the metal strip 1 (which is substantially identical to the minimum spacing) is in most instances in the region of a few mm, for example between 2 mm and 5 mm.

The maximum spacing AB may be significantly larger than the minimum spacing. In many cases, due to the larger spacing, the henceforth lower sensor currents ISi are so low that any meaningful evaluation of the sensor currents ISi and thus the determination of the mechanical oscillation amplitudes Ai of the regions 20 of the metal strip 1 is no longer possible. Despite the maximum spacing however, a continuing operation of the measuring device 19 (including a determination, based on this, of the mechanical oscillation amplitudes Ai of the regions 20 of the metal strip 1) may nevertheless be possible in some cases.

Figure 5:
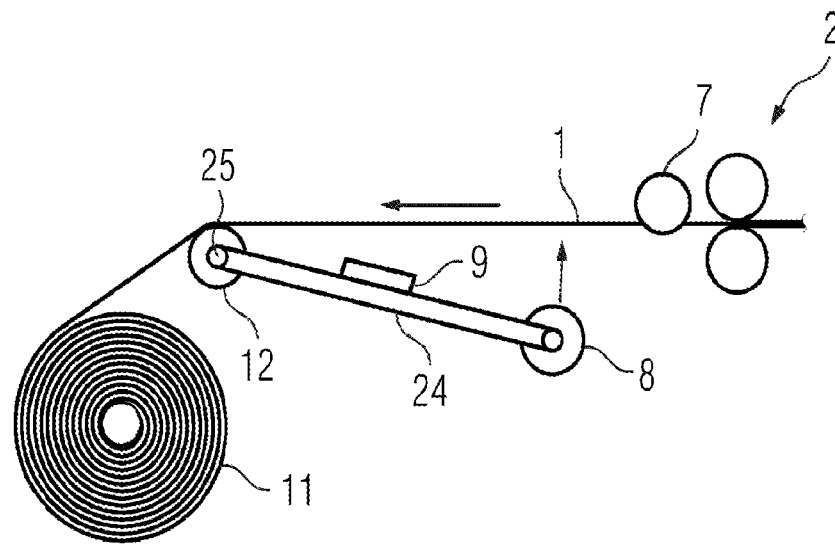
FIG. 5 shows a lateral view of a rolling device.

In the design embodiment according to FIGS. 1 and 2, the front deflection roller 8 is disposed above the metal strip 1, while the measuring assembly 9 is disposed below the metal strip 1. In this case, i.e. when the front deflection roller 8 and the measuring assembly 9 are disposed on mutually different sides of the metal strip 1, the front deflection roller 8 is typically a device which is independent of the measuring assembly 9. However, if the front deflection roller 8 and the measuring assembly 9 are located on the same side of the metal strip 1, it can be expedient according to the illustration in FIG. 5 to mechanically connect the front deflection roller 8 to the measuring assembly 9 such that the measuring assembly 9 and the front deflection roller 8 are movable only conjointly. For example, the front deflection roller 8 can be connected to the measuring assembly 9 by way of a lever arm 24 which is pivotably mounted in a bearing point 25. When the bearing point 25 is suitably chosen, it can be achieved as a result that a spacing of the measuring assembly 9 from the metal strip 1 remains constant when pivoting the lever arm 24. For example, the bearing point 25 can coincide with the rotation axis of the rear deflection roller 12, or lie in the immediate vicinity of this rotation axis.

The condition that the spacing of the measuring assembly 9 from the metal strip 1 remains constant is of course only met when the front deflection roller 8 is actuated onto the metal strip 1. When the front deflection roller 8 is spaced apart from the metal strip 1, the spacing of the front deflection roller 8 from the metal strip 1 varies, and thus too does the spacing of the measuring assembly 9 from the metal strip 1.

Figure 6:
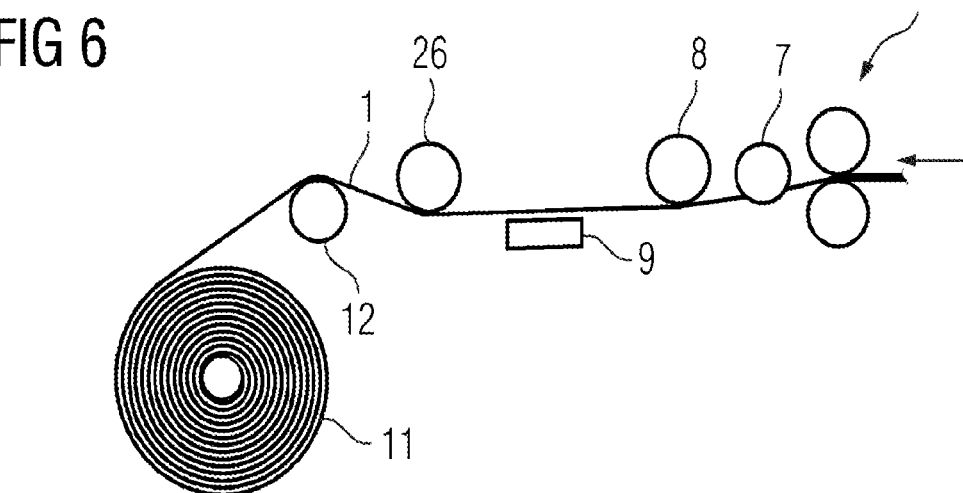
FIG. 6 shows a lateral view of a rolling device.

According to the illustration in FIG. 6, it is furthermore possible that a central deflection roller 26 is disposed between the measuring assembly 9 and the rear deflection roller 12. The effective length along which the metal strip 1 can be excited to mechanically oscillate can be kept particularly short as a result of this design embodiment. Furthermore, the direction in which the metal strip 1 is conveyed between the front and the central deflection roller 8, 26 can be set independently from the spacing a of the metal strip 1 from the measuring assembly 9 as a result.

Figure 7:
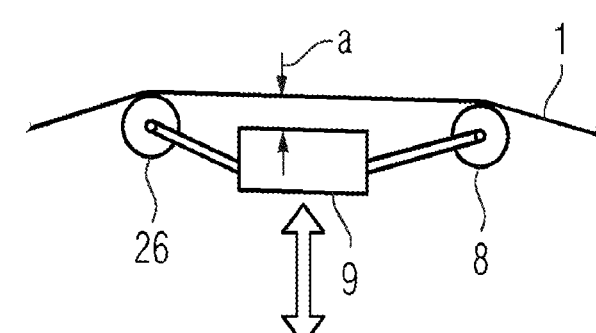
FIG. 7 shows a further measuring assembly and two deflection rollers.

As is illustrated in FIG. 7, the central deflection roller 26 can be mechanically connected to the measuring assembly 9 such that the measuring assembly 9 and the central deflection roller 26 are movable only conjointly. This design embodiment is particularly advantageous when, according to the illustration in FIG. 7, the front deflection roller 8, in addition to the central deflection roller 26, is also mechanically connected to the measuring assembly 9, thus forming a constructive unit. In this case, the constructive unit consisting of the measuring assembly 9, the front deflection roller 8 and the central deflection roller 26 can be held in a retracted position during the incipient coiling of the metal strip 1, so that problem-free incipient coiling of the metal strip 1 is possible. After the incipient coiling, the constructive unit is then deployed such that the front deflection roller 8 and the central deflection roller 26 deflect the metal strip 1. By virtue of the measuring assembly 9, the front deflection roller 8 and the central deflection roller 26 being combined to form the constructive unit, the spacing of the measuring assembly 9 from the metal strip 1 is thus also inevitably and automatically set.

The present invention has many advantages. The detection of measured values by means of which the flatness of the hot metal strip can be determined while coiling the hot metal strip 1 from aluminum is in particular made possible in a simple and reliable way.

LIST OF REFERENCE SIGNS

1 Metal strip
2 Roll stand
3 Working rollers
4 Intermediate rollers
5 Support rollers
6 Thickness measuring device
7 Trimming device
8 Front deflection roller
9 Measuring assembly
10 Coiling device
11 Coiler
12 Rear deflection roller
13 Connecting line
14 Mechanical excitation device
15 Suction fan
16 Suction openings
17 Suction duct
18 Modulator element
19 Measuring device
20 Regions
21 Electromagnetic excitation devices
22 Electromagnetic receiver devices
23 Cooling water
24 Lever arm
25 Bearing point
26 Central deflection roller
a Spacing
Ai Amplitudes
b Width
IA Excitation currents
ISi Sensor currents
x Conveying direction

The invention claimed is:
1. A rolling device for a metal strip from aluminum,
wherein the rolling device has a roll stand with an outlet side;
wherein the rolling device has a coiling device disposed on the outlet side of the roll stand, having a coiler and a rear deflection roller;
wherein the rear deflection roller is disposed between the roll stand and the coiler;
wherein the rolling device has a measuring assembly which is disposed between the roll stand and the rear deflection roller and is specified to determine a flatness of the metal strip;
wherein the measuring assembly has a mechanical excitation device by means of which the metal strip in a thickness direction thereof is excitable to mechanically oscillate;
wherein the measuring assembly has a measuring device by means of which, for a plurality of regions of the metal strip that lie next to one another in a width direction of metal strip, an amplitude of an excited mechanical oscillation of a respective region of the metal strip is detectable, wherein
the rolling device has a trimming device which is disposed on the outlet side of the roll stand and by means of which one band of the metal strip is severed on both sides of the metal strip so that only a remaining central region of the metal strip is supplied to the rear deflection roller and from the rear deflection roller to the coiler, and wherein the rolling device has a front deflection roller which is disposed between the trimming device and the measuring assembly and by means of which the metal strip is deflected from a direct connecting line between the roll stand and the rear deflection roller.

2. The rolling device as claimed in claim 1, wherein the mechanical excitation device is configured as a suction device by means of which the metal strip is periodically impinged with a vacuum.

3. The rolling device as claimed in claim 1, wherein the measuring device is configured as a measuring device operating in a contactless manner, by means of which the amplitude of the excited mechanical oscillation of the respective region of the metal strip is detectable in the contactless manner.

4. The rolling device as claimed in claim 3, wherein the measuring device for inducing eddy currents in the metal strip has a number of electromagnetic excitation devices, and for detection of the amplitude of the mechanical oscillation of each respective region has a respective electromagnetic receiver device by means of which an intensity of the eddy current excited in the respective region is detectable.

5. The rolling device as claimed in claim 1, wherein the front deflection roller in the thickness direction of the metal strip is movable substantially orthogonally to a direct connecting line of the roll stand and the rear deflection roller.

6. The rolling device as claimed in claim 1, wherein the front deflection roller is actuatable onto the metal strip from above.

7. The rolling device as claimed in claim 1, wherein the front deflection roller is mechanically connected to the measuring assembly such that the front deflection roller and the measuring assembly are movable only conjointly, and in that the front deflection roller and the measuring assembly are located on a same side of the metal strip.

8. The rolling device as claimed in claim 7, wherein the front deflection roller by way of a pivotably mounted lever arm is connected to the measuring assembly so that when the front deflection roller is actuated onto the metal strip a spacing of the measuring assembly from the metal strip remains constant when pivoting the lever arm.

9. The rolling device as claimed in claim 8, wherein the central deflection roller is mechanically connected to the measuring assembly such that the central deflection roller and the measuring assembly are movable only conjointly.

10. The rolling device as claimed in claim 1, wherein a central deflection roller is disposed between the measuring assembly and the rear deflection roller.

11. The rolling device as claimed in claim 1, wherein the measuring device is water-cooled.

12. The rolling device as claimed in claim 1, wherein a spacing of the measuring device from the metal strip is adjustable between a minimum spacing and a maximum spacing.

13. The rolling device as claimed in claim 1, wherein the metal strip is a hot metal strip, and wherein water cooling of the measuring device, minimum spacing of the measuring device from the hot metal strip, and maximum spacing of the measuring device of the hot metal strip are mutually adapted in such a manner that the measuring device at the minimum spacing is operated permanently with the water cooling, and at the maximum spacing is operated permanently without the water cooling or at least the measuring device is not damaged by heat received from the hot metal strip.

* * * * *